April 15, 1969     C. H. WEBER     3,439,132
INSULATED ELECTRICAL CONDUCTOR SYSTEM
Filed April 3, 1967
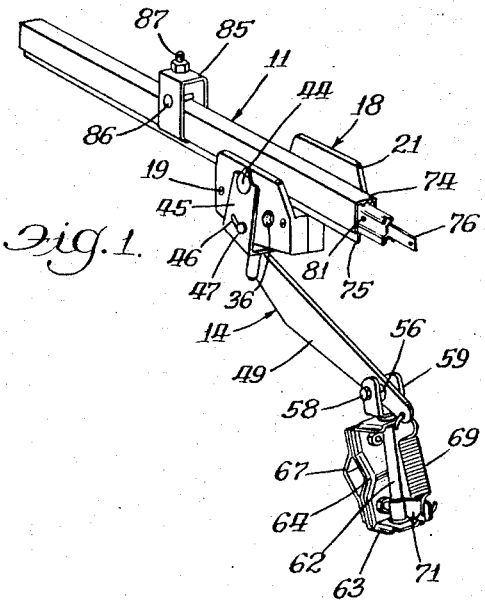
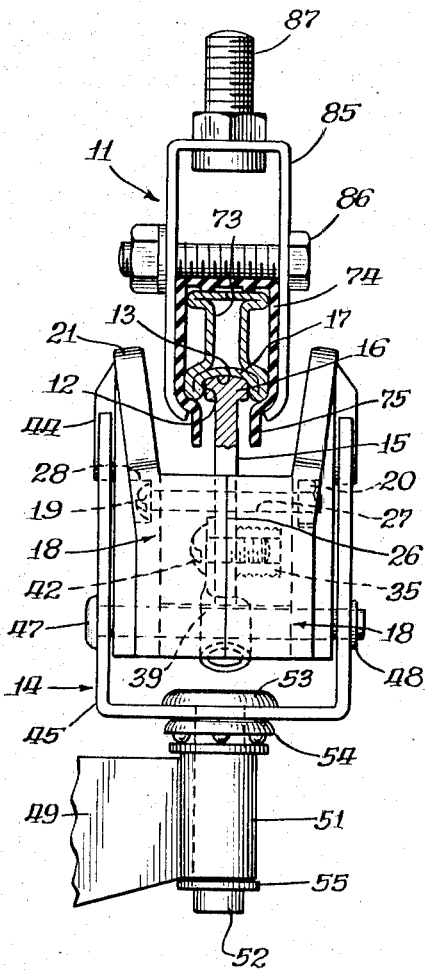
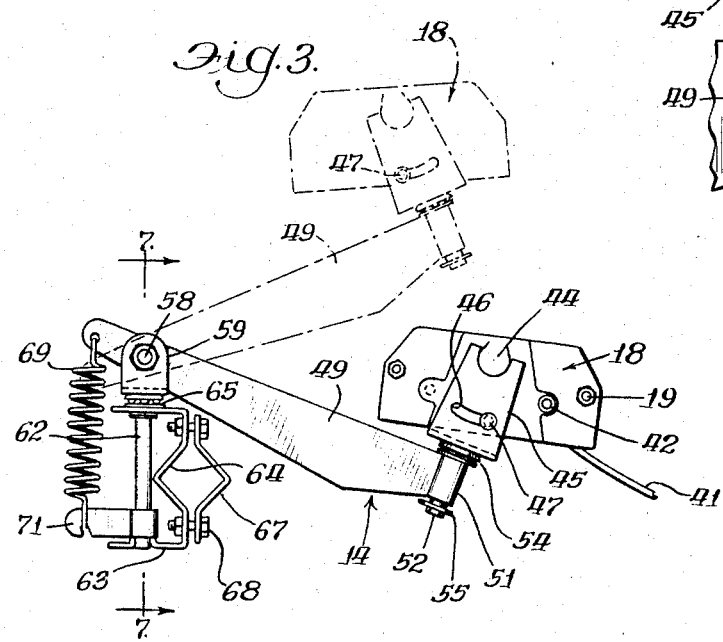
Inventor:
Charles H. Weber
By Horton, Davis,
Brewer & Brugman
Attys.

April 15, 1969  C. H. WEBER  3,439,132
INSULATED ELECTRICAL CONDUCTOR SYSTEM
Filed April 3, 1967
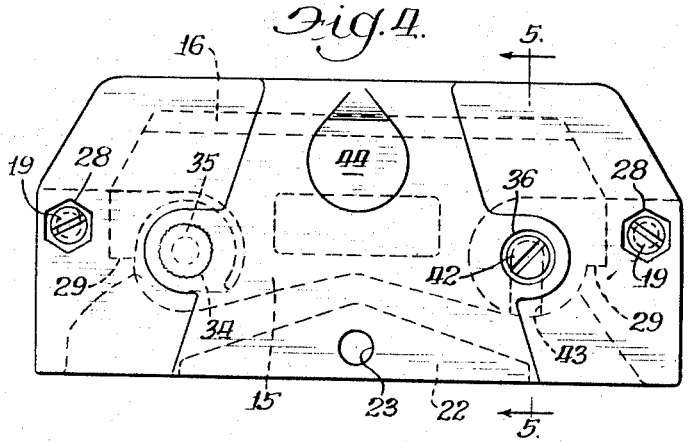
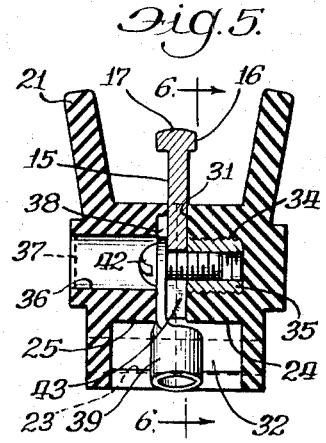
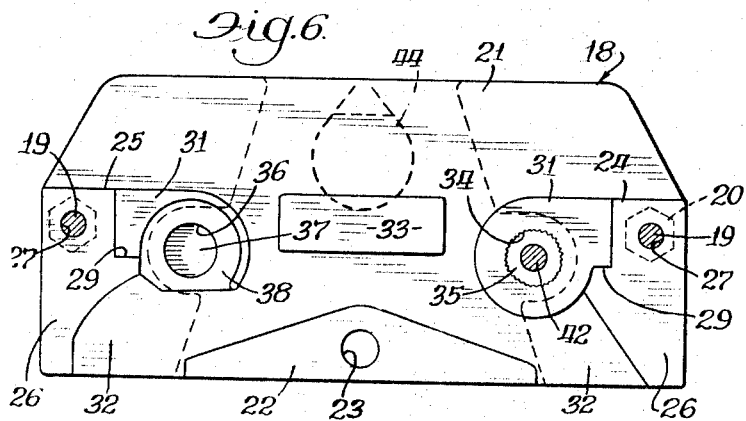
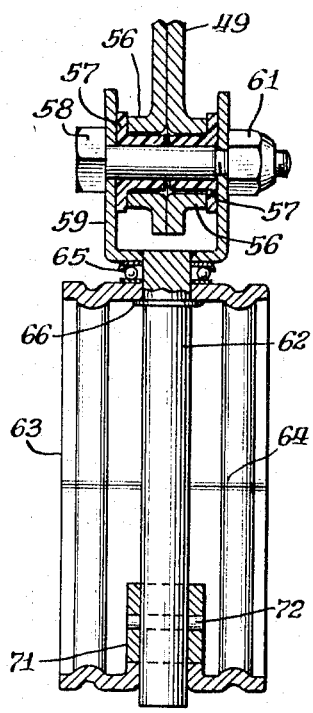
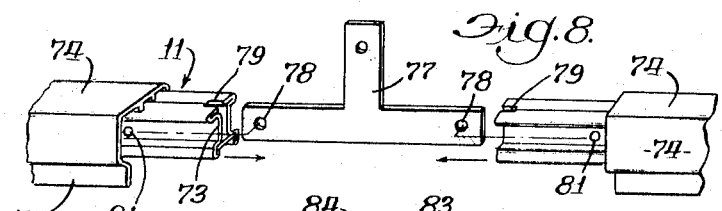
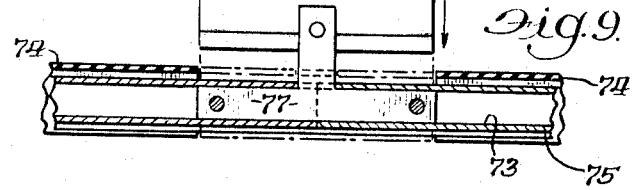
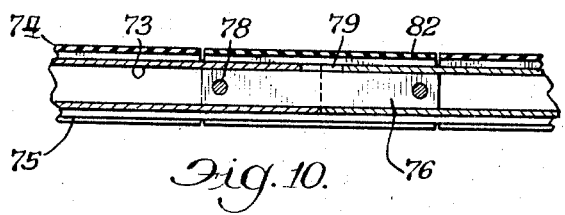
Inventor:
Charles H. Weber
By: Horton, Davis,
Brewer & Brugman
Attys.

United States Patent Office 3,439,132
Patented Apr. 15, 1969

3,439,132
INSULATED ELECTRICAL CONDUCTOR SYSTEM
Charles H. Weber, Mayville, Wis., assignor to Maysteel Products Corp., Milwaukee, Wis., a corporation of Wisconsin
Filed Apr. 3, 1967, Ser. No. 627,798
Int. Cl. B60l 5/08; B60m 1/04
U.S. Cl. 191—35                    10 Claims

ABSTRACT OF THE DISCLOSURE

System transmitting electric energy to mobile equipment, such as cranes and hoists, with translationally movable collector brush guided only by metal conductor bar channel to prevent wear and breakage of insulation; T-connectors between conductor bar sections for selective connections of power feed; complete surface contact between concave top wall of conductor bar channel and upper convex edge of brush; brush holder comprising separable identical halves with two screws for securing same together to clampingly engage the brush therebetween and a third screw for conductively securing lead connector to brush, so brush may be changed after merely loosening three screws and without disconnecting lead connector from brush holder; a yoke tiltably mounting brush holder and pivoted on vertical axis with ball thrust bearing on one end of laminated steel arm, latter secured near other end to mounting bracket by horizontal pivot having nylon bushings, and spring interconnectig other end of arm and mounting bracket to urge brush holder upwardly.

BACKGROUND OF THE INVENTION

Field of the invention

This invention relates generally to electrical power transmission, and more particularly to transmitting electric energy to mobile industrial equipment, such as cranes, hoists, machine tools, and the like, by means of an overhead conductor bar and a collector assembly mounted on the mobile equipment.

Description of the prior art

Pertinent developments in systems of this type are illustrated in U.S. Letters Patent No. 2,704,309 of Mar. 15, 1955, No. 2,860,198 of Nov. 11, 1958, No. 3,114,441 of of Dec. 17, 1963, and No. 3,144,508 of Aug. 11, 1964. These employ translationally movable collector brushes and overhead insulation-protected conductor bars with open-bottom channels receiving the brushes, but they are troubled with incorrect alignment, varying and inadequate contact between brush and bar, wear and breakage of insulation because of contact with and between the insulated parts during use, expensive conductor bar construction and mounting, and complicated and expensive designs of brush holders and collector assemblies.

SUMMARY OF THE INVENTION

The insulated electrical conductor system of this invention overcomes the difficulties noted with respect to those of the prior art. It maintains maximum electrical contact between the relatively movable collector brush and conductor bar by providing the latter with an open channel along its under surface having vertical side walls joined at their upper ends with a concave surface, and the collector brush with a convex upper surface matingly engageable with that concave channel surface to establish full surface contact therebetween at all times, and insures proper alignment of these mating surfaces under all circumstances of use by employing a collector assembly which is laterally rigid and includes novel means for maintaining upward pressure on the brush and smooth horizontal and vertical pivoting of relatively movable parts thereof. It includes a brush holder comprising a housing of electric insulating material having separable portions clampingly engaging the brush and each provided with a protective flange spaced outwardly from and extending above the brush, and an inverted U-shaped cover of insulating material on the conductor bar having sides defining protective skirts extending downwardly substantially as extensions of the open channel side walls, with any contacting between relatively movable insulating material parts being prevented by virtue of guiding of the brush during translational movements relative to the conductor bar being effected solely by engagement between the metal surfaces of the brush and the conductor bar channel.

The invention further facilitates optional attachment of an electrical lead at either end of the brush holder and minimizes the cost of manufacture and installation by providing a brush holder having separable portions each of which has a first transversely extending cavity adjacent one end and a second transversely extending cavity near the other end, with tapped means non-rotatably mounted in the first cavity and a screw threadingly engageable with the tapped means through the second cavity in the companion separable portion to secure the electrical lead conductively to the brush. Costs of manufacture and installation also are minimized by making the conductor bar of separable sections each formed from a single steel strip to provide the open bottom channel and a non-circular bore and having a shorter insulation cover to expose end portions of the bar sections having apertures communicating with the bores to facilitate interconnection of adjacent sections by screws through the apertures and tapped apertures in connectors having a cross-sectional shape to matingly engage in the bores, with auxiliary cover pieces to protect the exposed end portions of adjacent connected sections, the latter being slotted to accommodate T-shaped connectors at any junction where it is desired to insert a power feed without requiring any changes or construction alterations to be made in the field.

The brush holder further employs a lead connector lug having a head with a transverse aperture for receiving the screw, and screw means extending through the separable portions for drawing those insulating material portions together to clampingly engage the brush therebetween, so that the brush may be removed from the holder after merely loosening the lead screw and the clamping screw means, while the lead connector lug remains attached to the brush holder. The importance of this simplified construction in facilitating brush replacement will be particularly appreciated in any installation where the same is located at a considerable distance above the floor or other supporting surface for the industrial equipment involved.

In the drawings:

FIGURE 1 is a perspective view of portions of an insulated electric conductor system embodying the invention;

FIG. 2 is an enlarged end elevational view of the brush holder of FIG. 1, with a portion of the brush and the conductor bar with which it engages shown in transverse section to illustrate the contacting relationship therebetween;

FIG. 3 is a side view of the collector assembly shown with the brush holder in its lowermost position in full lines and in broken lines in its uppermost position;

FIG. 4 is an enlarged side elevation of the brush holder, as seen from the left side of FIG. 2;

FIG. 5 is a transverse sectional view taken substantially on the line 5—5 of FIG. 4;

FIG. 6 is a longitudinal sectional view taken substantially on the line 6—6 of FIG. 5;

FIG. 7 is an enlarged transverse section through the arm mounting means of the collector assembly, as taken substantially on the line 7—7 of FIG. 3;

FIG. 8 is an exploded detail perspective view of a portion of the conductor bar showing end portions of adjacent sections and a T-shaped connector therefor;

FIG. 9 is a longitudinal vertical section through that part of the conductor bar of FIG. 8 as interconnected by the T-connector, with an auxiliary cover piece in process of being mounted thereon; and FIG. 10 is a longitudinal sectional view similar to FIG. 9 showing a modified form of connector and auxiliary cover.

DESCRIPTION OF THE PREFERRED EMBODIMENT

Referring more particularly to FIG. 1, reference numeral 11 indicates in general a conductor bar embodying the features of this invention which includes an open channel along its lower surface defined by vertical side walls 12 (FIG. 2) having their upper end joined by a concave upper surface 13. Further details of the conductor bar 11 will be described hereinafter. A collector assembly, indicated generally by reference numeral 14, is adapted to cooperate with the conductor bar 11 and includes an elongated metal brush 15 formed with a flange 16 along its upper edge (FIG. 2) with an upper convex surface 17 adapted to matingly engage the concave surface 13 of the open channel along the bottom of the conductor bar 11. The flange 16 of the brush 15 is somewhat thinner laterally than the channel defined by the vertical walls 12 to permit of some degree of laterally angular displacement of the brush relative to the conductor bar, but the contacting engagement of the brush in the metal channel of the conductor bar defined by the vertical walls 12 alone limits lateral movements of the brush relative to the conductor bar.

Forming a part of the collector assembly 14 is a brush holder comprising a housing having identical separable portions 18 secured together by means of two screws 19 and associated nuts 20 to clampingly engage the main body portion of the brush 15. Each housing portion 18 is formed from suitable reinforced polyester insulating material in well-known manner and comprises an upper flange portion 21 preferably somewhat angularly disposed, as best seen in FIGS. 2 and 5, and spaced outwardly from the brush 15 a sufficient distance to insure adequate clearance from the conductor bar 11, while extending upwardly a substantial distance above the brush when the latter is mounted in the holder. Each housing portion 18 also is provided with a centrally disposed, inward extension 22 along the base thereof of substantially triangular longitudinal vertical section (FIG. 6) and having a transverse aperture 23 extending substantially centrally therethrough.

Also formed integrally and as a part of each housing portion 18 are inwardly extending brush-clamping end portions 24 and 25 which have inner vertical surface 26 in the plane of the inner vertical surface of the lower central extension 22. Each of these inwardly extending end portions 24 and 25 has a transverse aperture 27 extending therethrough with an hexagonal cavity 28 formed at its outer end (FIG. 4). The centrally inward part of each end extension 24 and 25 is reduced in lateral thickness to provide a right-angled shoulder 29 and an end brush-clamping surface 31 spaced laterally from the surfaces 26 just slightly less than one-half the thickness of the body portion of the brush 15. The inner part of each end extension 24 and 25 also is shaped to form a space 32 (FIG. 6) between it and the lower central extension 22 which is open at the bottom of the housing.

Spaced between the end extensions 24 and 25 and above the lower central extension 22 is an upper, centrally disposed, inward extension 33 (FIG. 6) having its inner vertical surface in the plane of the surfaces 31 for clampingly engaging the body portion 15 of the brush when the two screws 19 are tightened to bring the separable portions 18 of the housing together.

The centrally inward part of the end portion 24 (FIGS. 5 and 6) is provided with a transversely disposed, inwardly extending cavity 34 into which is press-fitted a screw-receiving means, which preferably is in the form of a tapped sleeve insert 35 secured against rotation in well-known manner, as by having its outer surface knurled. The other end portion 25 has an inwardly extending, transverse cavity 36 which terminates just short of the outer surface of the housing 18 to provide a knock-out 37, as shown in FIG. 6 and in broken lines in FIG. 5, which may be chipped off, drilled or broken away in well-known manner, as by a screwdriver, or the like, if it is desired to have access to the cavity 36 from the exterior of the housing. The cavity 36 is enlarged at its inner end at 38 (FIGS. 5 and 6) to accommodate the circular clamping head portion of a lug or power lead connector 39 which is adapted to be secured by crimping, soldering, or the like, to the usual wire lead or pigtail 41 employed (FIG. 3) which will extend upwardly thereto through the associated opposing spaces 32 of the brush holder housing.

From the above description, it will be appreciated that the lug or power lead connector 39 may be mounted in the field optionally at either end of the brush holder, since each of the separable portions 18 of the latter has a tapped insert 35 mounted therein and, when those portions 18 are mounted in their normal opposed relationship, the end potrion 24 of each is opposite the end portion 25 of the other and their cavities 34 and 36 are opposingly axially aligned. When brought to its use location, the brush holder of the collector assembly normally will include such a power lead connector 39 mounted in one end thereof by means of a screw 42 which, as best seen in FIG. 5, is screwed into one of the inserts 35 to clampingly secure the head portion of the lug 39 against the body portion of the brush 15. The lug or connector 39 thus may be attached to one separable portion 18 before the two such portions are secured together by the screws 19. Therefore, the person installing the conductor system in the field may remove either of the two knock-outs 37 to provide access at the selected end of the brush holder to the screw 42. And if the latter happens to be presented at the other end of the housing from that selected, it is a simple matter to separate the housing portions 18 to remove the screw 42 without cutting away knock-out 37 at the outer end of the cavity 36 in the inner end of which the head of the screw 42 is disposed.

The lower corner portions of the brush 15 are provided with ringht-angle notches, as shown in FIG. 4, for cooperation with the shoulders 29 of the end portions 24, 25 of the brush holder to positively limit downward and longitudinal movements of the brush relative to the holder, but the screws 19 and their associated nuts 20, which are completely insulated from the brush by the housing potrions 18, are the sole means employed for retaining the brush in the housing. One end of the lower portion of the main body 15 of the brush also is provided with a vertical slot 43 (FIGS. 4 and 5) wide enough to slidingly clear the shank of the screw 42 and deep enough to permit the desired seating of the brush on the shoulders 29. This ararngement permits removal and replacement of the brush, after merely loosening the three screws 19, 42, without requiring complete separation of the housing portions 18. At the same time, the lead connector or lug 39 will remain connected to the brush housing and will be prevented from falling therefrom by screw 42. A new brush 15 may be mounted in the holder in obvious manner merely by seating the same on the shoulders 29, tightening the two screws 19 to clampingly engage the brush between the housing portions 18, and tightening the screw 42 to conductively secure the lug 39 to the brush.

The outer side of each of the separable housing portions 18 of the brush holder is provided with a trunnion 44 (FIGS. 3 and 4) in the form of an integral, substantially cylindrical lug. A U-shaped metal yoke 45 has semicircular recesses in the upper ends of its arms as bearings for the trunnions 44 and curved slots 46 near the lower ends of its arms to receive a transverse bolt or shaft 47 extending through the aperture 23. A standard spring lock-ring 48 preferably is pressed onto the end of the bolt 46 (FIG. 2) to retain the brush holder in the yoke 45. With this arrangement, the brush holder comprising the two separable portions 18 is pivotally mounted by means of the trunnions 44 for longitudinal rocking movement relative to the yoke 45 on a horiozntal transverse axis, while being retained against lateral movement relative thereto, and the pivotal movements permitted the brush holder relative to the supporting yoke 45 are limited by the bolt 47 and the slots 46. This enables the upper edge of the brush 15 to assume a horizontal position throughout the range of its permitted vertical movements, as illustrated in full and broken lines in FIG. 3.

The collector assembly 14 also includes an arm 49 which preferably is of laminated steel construction formed of two complementally shaped parts secured together by spot welding, or the like. The upper end of each of these parts of the arm 49 is shaped as a semi-cylindrical portion 51, so that the two portions 51 comprise a sleeve for receiving and mounting a vertical pivot post 52 (FIG. 2) which passes through a suitable aperture in the base of the yoke 45 and is provided with a head 53 secured to the yoke in any suitable manner, as by welding. Interposed between the upper end of the sleeve formed by the end portions 51 of the arm 49 and the yoke 45 is a suitable ball thrust bearing means 54, and the latter and the pivot post 52 are held in the upper end of the arm 49 by any suitable means, such as a standard spring lock-ring 55. The members 51–55 thus comprise a first vertical pivot means for mounting the brush holder on the upper end of the arm 49.

It is desirable to provide horizontal pivot means for mounting the lower end of the arm 49, and a second vertical pivot means also is employed between the latter and the main mounting means for the collector assembly 14. To this end, the two complementally shaped parts of the arm 49 are each punched outwardly adjacent the lower end of the arm to provide an annular flange 56, as best seen in FIG. 7. Pressed into each such flange 56 is an outwardly flanged nylon bushing 57, and a shouldered bolt 58 is rotatably disposed in, and extends through, these bushings 57. The horizontally disposed bolt 58 also extends through suitable apertures in the upstanding arms of a U-shaped shaft bracket 59, and a suitable lock nut 61 retains the bolt in this assembled relationship. The base portion of the shaft bracket 59 is provided with a central aperture to receive the upper end of a vertical shaft 62 which is welded or otherwise suitably secured thereto and comprises a second vertical pivot means for securing the lower portion of the arm 49 to the mounting means for the collector assembly.

This mounting means includes a saddle 63 (FIGS. 1, 3 and 7) having a pair of horiozntally disposed, apertured arms rotatably mounted on the vertical shaft 62 and joined by a base formed to provide a right angled clamping portion 64 (FIG. 3). Interposed between the upper arm of the saddle 63 and the shaft bracket 59 is a ball thrust bearing means 65 (FIG. 7), and the saddle 63 is retained on the shaft 62 by a spring lock-ring 66 pressed upwardly against the lower surface of the upper arm of the saddle. As best seen in FIG. 3, a saddle bracket 67 complementally shaped relative to the clamping portion 64 of the saddle 63 is mounted thereon by means of nuts and bolts 68 for securing the mounting means in well-known manner to that piece of mobile equipment with which the collector assembly is to be employed.

Spring means, preferably in the form of a coil spring 69, interconnects the lower end of the arm 49 and this mounting means to resiliently maintain the concave and convex surfaces 13, 17 of the conductor bar 11 and brush 15, respectively, in mating engagement under all circumstances of use. As best seen in FIGS. 1 and 3, the upper end of the spring 69 is engaged in a suitable aperture in the normally lower end of the arm 49, while the lower end of the spring engages in a slot in the outer end of a spring bracket 71 formed as a hook for such spring engagement. The inner end of the bracket 71 is formed as a sleeve slidably mounted on the vertical shaft 62 just above the lower arm of the saddle 63 and secured thereto in any suitable manner, as by means of a pin 72 shown in FIG. 7. It thus will be seen that the collector assembly 14 comprises a laterally rigid construction, and includes novel means for maintaining upward pressure on the brush and smooth, anti-friction, horizontal and vertical pivoting of the relatively movable parts thereof. By virtue of this construction, the brush holder has a wide vertical range of movement, as illustrated by the full line and broken line positions shown in FIG. 3, and the limited longitudinal rocking of the holder and the brush 15 relative to its yoke 45 will insure full surface contact being maintained between the upper convex surface 17 of the brush and the concave surface 13 of the conductor bar 11 by the spring 69 at all times.

In addition to this arrangement which insures lateral movements of the brush relative to the conductor bar being limited solely by metal-to-metal engagements between the flange 16 of the brush and the vertical walls 12 of the conductor bar, this invention also comprehends novel conductor bar structure for thus cooperating with the collector assembly to assure maximum efficiency of operation and installation. As best seen in FIGS. 1, 2 and 8, the conductor bar 11 comprises separable sections which are each formed from a single steel strip to provide the open channel defined by the previously described vertical walls 12 and concave surface 13, and a non-circular bore 73 which preferably is substantially rectangular in transverse cross-section. The strip comprising the bar section is reversely bent or shaped at two points to define the lower marginal edge portions of the bar, and the main body of the bar preferably is narrower than the lower, channel-forming portion thereof to enhance the structural strength of the bar, with the strip also being reversely bent or formed at two additional points to define upper marginal edge portions of substantially the same overall width as the bottom of the bar. An inverted U-shaped cover 74 of electrical insulating material, preferably extruded rigid vinyl plastic, is provided in the form of separate sections somewhat shorter in length than the individual metal sections of the bar for embracingly engaging the latter and having side portions terminating at their lower edges in protective skirts 75 extending downwardly substantially as extensions of the open channel side walls 12.

As illustrated in FIGS. 8, 9 and 10, the end portions of adjacent sections of the conductor bar 11 are structurally and electrically interconnected by means of either plain connectors 76 or T-connectors 77, both of which have a cross-sectional shape to matingly engage in the bores 73 and tapped apertures 78 adjacent the ends thereof. The plain connectors 76 normally are employed in interconnecting adjacent sections of the conductor bar, while a T-connector 77 may be employed at any interconnecting point or juction where it is desired to insert a power lead without requiring any changes or construction alterations to be made in the field. To this end, the upper walls of the metal sections of the conductor bar 11 are provided with end slots 79 to accommodate the centrally disposed upward extensions of the T-connectors 77 whenever they may be used. The end portions of each of the conductor bar sections also are provided with transverse apertures 81 for receiving suitable screws adapted to engage in the apertures 78 of the connectors to secure the same thereto. After adjacent sections of the conductor bar have thus been secured together, the end portions thereof will be exposed, so means are provided in the form of auxiliary cover pieces 82 and 83 (FIGS. 9 and 10) constructed similarly to the cover 74 and of such length as to be engageable with the bar to protect the otherwise exposed end portions of the connected sections. The only difference between the auxiliary cover piece 82 shown in FIG. 10 and 83 shown in FIG. 9 is that the latter is provided with a central aperture or slot 84 in its top wall to accommodate the vertical extension of a T-connector 77. The interconnected sections of the conductor bar 11 are suspended from any suitable supporting structure by means of inverted U-shaped brackets or hangar clamps 85 (FIGS. 1 and 2) the legs of which terminate in inwardly curved lower edge portions engageable with the covers 74 adjacent the skirts 75 and somewhat below the lower edges of the metal conductor bar. These mounting brackets 85 may be secured to the conductor bar by clamping bolts 86 and to the structural supporting means by the usual bolts 87.

From the foregoing, it is believed that those familiar with the art will readily recognize and appreciate the unique features and advancement of the present invention over previously known devices of this character. Further, it will be understood that while the present invention has been described in association with a particular and preferred embodiment thereof as set forth in the accompanying drawings and above described, the same nevertheless is susceptible to change, variation and substitution of equivalents without departure from the spirit and scope of this invention.

I claim:

1. An insulated electrical conductor system, comprising an elongate substantially horizontally disposed conductor bar formed of metal to present an open channel along its under surface with vertical side walls joined at their upper ends by a concave upper surface, and a collector assembly translationally movable relative to said conductor bar, comprising an elongate metal brush having a convex upper surface matingly engageable with said concave upper surface to assure full surface contact therebetween and alone limiting lateral movements of said collector assembly relative to said conductor bar by engagements with said vertical metal side walls, a brush holder comprising a housing of electrical insulating material having separable portions clampingly engaging said brush and each provided with a flange spaced outwardly from and extending above said brush, a metal yoke supporting said brush holder for longitudinal rocking movements relative thereto, an arm secured at its upper end to said yoke by vertical pivot means, mounting means secured by horizontal pivot means to said arm adjacent its lower end, and spring means interconnecting the lower end of said arm and said mounting means to resiliently maintain said mating convex and concave surfaces in contact with each other.

2. An insulated electrical conductor system according to claim 1, wherein said brush comprises a body portion and a flange along its upper end of substantially greater width than said body portion, with the upper surface thereof comprising said convex upper surface, the width of said flange being slightly less than that of said channel to permit limited laterally angular movements of said brush relative to said conductor bar while maintaining full surface contact therebetween.

3. In an insulated electrical conductor system according to claim 1, an inverted U-shaped cover of electrical insulating material embracingly engaging said conductor bar and having side portions defining protective skirts extending downwardly substantially as extensions of said open channel side walls, wherein the guiding of said brush during translational movements relative to said conductor bar is effected solely by engagement between the metallic surfaces of said brush and said conductor bar channel and contacting of relatively moving insulating material parts is prevented.

4. An insulated electrical conductor system according to claim 3, wherein said conductor bar comprises separable sections each formed from a single steel strip to provide said open channel and a non-circular bore, and said U-shaped cover comprises a separate part for, and shorter in length than, each said section to expose end portions of said sections having apertures therein communicating with said bores, connectors having a cross-sectional shape to matingly engage in said bores, screws in said apertures for engaging said connectors to secure adjacent said sections in end-abutting relationship, and auxiliary U-shaped cover pieces engageable with each adjacent pair of said exposed end portions.

5. An insulated electrical conductor system according to claim 4, wherein certain of said connectors are provided with a centrally disposed upward extension for connection to a power feed for said conductor bar, the top wall of each section of said conductor bar having a slot to accommodate said extensions, and certain of said auxiliary cover pieces also being slotted to accommodate said extension.

6. A collector assembly comprising a brush, a brush holder having separable portions each of which comprises a first transversely extending cavity adjacent one end and a second transversely extending cavity adjacent the other end, tapped means nonrotatably mounted in said first cavity, and a screw threadingly engageable with said tapped means through said second cavity in the companion separable portion of said brush holder to secure an electrical lead conductively to said brush, whereby the lead may be attached optionally at either end of the brush holder.

7. In a collector assembly according to claim 6, a lead connector lug having a head with a transverse aperture for receiving said screw, the inner end of said second cavity being enlarged to accommodate the head of said lug.

8. In a collector assembly according to claim 7, screw means for securing said separable portions together to clampingly engage said brush therebetween, whereby said brush may be removed from said holder after merely loosening said screw and said screw means, while said lead connector lug remains attached to said brush holder.

9. In a collector assembly according to claim 1, screw means for securing said separable portions together to clampingly engage said brush therebetween to retain said brush in said holder, a lead connector lug, and a screw for conductively securing said lead connector lug to said brush, whereby said brush may be removed from said holder after merely loosening said screw and said screw means.

10. In a collector assembly according to claim 1, ball thrust bearing means comprising part of said vertical pivot means, said arm being of laminated steel construction, and anti-friction bushings comprising part of said horizontal pivot means, whereby proper alignment of said brush relative to said conductor bar is assured to effect full contact of said convex surface with said concave surface.

References Cited

UNITED STATES PATENTS

| | | | |
|---|---|---|---|
| 463,760 | 11/1891 | Sargent | 191—35 |
| 2,422,132 | 6/1947 | Saiter. | |
| 2,498,568 | 2/1950 | Mosebach | 191—44.1 |
| 2,704,309 | 3/1955 | Ford et al. | 191—35 |
| 2,709,724 | 5/1955 | Mageoch | 191—59.1 |

(Other references on following page)

| | | | |
|---|---|---|---|
| UNITED STATES PATENTS | | | |
| 2,994,734 | 8/1961 | Scofield et al. | 191—44.1 X |
| 3,189,679 | 6/1965 | Scofield et al. | 191—44.1 X |
| 3,303,294 | 2/1967 | Howell | 191—59.1 X |
| FOREIGN PATENTS | | | |
| 970,482 | 9/1958 | Germany. | |

ARTHUR L. LA POINT, *Primary Examiner.*

U.S. Cl. X.R.

191—59.1